United States Patent Office 3,393,362
Patented July 16, 1968

3,393,362
PROCESS FOR DETECTING IRREGULARITIES
IN A METALLIC SURFACE
Raymond T. Wright, Penfield, and James E. Young, Pittsford, N.Y., assignors to Xerox Corporation, Rochester, N.Y., a corporation of New York
Filed Oct. 30, 1964, Ser. No. 407,694
1 Claim. (Cl. 324—71)

ABSTRACT OF THE DISCLOSURE

A technique for the inspection of highly finished metallic surfaces is disclosed. A sheet of photographic film is positioned in contact with the surface to be inspected. A conductive member is placed against the side of the film non-adjacent to the test surface and a high DC voltage is established between the member and the test surface. Small defects in the test surface will show up in the developed film after it is processed.

---

Figure 1:
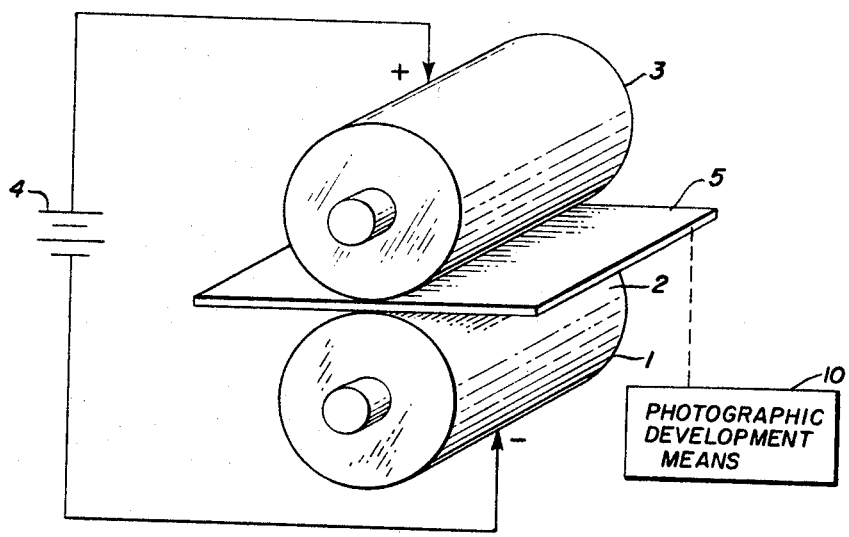

This invention relates to surface inspection processes and particularly to such processes whereby minute flaws and discontinuities may be detected in highly finished metallic surfaces.

Modern production methods and modern technology in general have created increasing demands for metallic products and machine elements possessing surface finishes of a very high order of smoothness and continuity. The need for such highly finished metallic surfaces has created a corresponding demand for rapid and highly efficient inspection techniques. Although many such techniques are well known in the art, yet it has been found in general that techniques suitable for inspection of very highly finished metallic surfaces are time-consuming, complex overly-sophisticated, and relatively expensive. In one well-known technique, for example, the surface to be inspected is first intensely and carefully illuminated, then an image of the surface is formed and projected through complex and costly optics onto a screen, and finally tedious visual observation of the projected image is made by a necessarily highly skilled technician.

Accordingly, it is an object of the present invention to provide a process whereby inspection of a highly finished metallic surface may be accomplished in an extremely simple and yet highly efficient manner.

It is a further object of the present invention to provide a process for inspection of highly finished metallic surfaces which may be readily carried out by comparatively unskilled operators.

It is a further object of this invention to provide a process for inspection of highly finished metallic surfaces which is relatively economical and which may be effectively carried out with but a bare minimum of equipment.

Briefly, the present invention accomplishes these and other objects by employing a sheet of unexposed photographic film positioned in intimate contact with the metallic surface to be inspected. A highly finished member is placed against the side of the photographic film non-adjacent to the surface to be tested and a high D.C. voltage is established between the member and the test surface. The sheet of photographic film is then removed and developed. It is then found that a very clear profile of even the most minute flaws present on the test surface has been formed on the now developed and otherwise clear photographic film.

The invention is illustrated by way of example in the drawings in which:

FIG. 1 diagrammatically demonstrates the practice of the invention where the surface to be tested is cylindrical in form.

Figure 2:
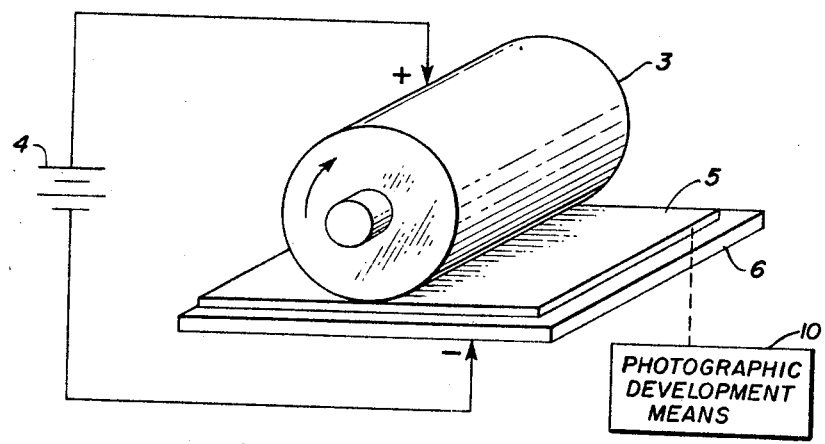

FIGURE 2 diagrammatically illustrates the practice of the invention where the surface to be tested is essentially flat.

In FIGURE 1, the metal surface to be inspected is formed as the highly finished surface 1 of cylinder 2. Cylinder 2 might, for example, be one of the myriad of such highly finished cylinders utilized in the processing of photographic film and related products. Cylinder 2 is rotatably mounted on its own axis and is in tangential contact with master roller 3. The latter roller 3 must of necessity have a very high and a very uniform surface finish throughout, such finish preferably approaching 1–2 microinches. This master roller 3 is also rotatably mounted on its own axis. A high DC voltage supply is provided at 4 with alternate leads extending to the test sample surface 1 and the master roller 3, respectively. Electrical contact with the two cylinders is maintained continuously.

In order to inspect the test sample surface 1, a sheet of ordinary photographic film 5 is inserted between the master roller 2 and the test sample cylinder 2, and with a high voltage now operating, the film 3 is drawn between these rotatable bodies so that all portions of the sample surface 1 to be tested come into contact with the film material. As the film is drawn through, sufficient pressure is maintained between the adjacent roller and cylinder to assure intimate contact between the film sheet and the alternating metallic surfaces. Subsequently, the high voltage source is turned off and the film sheet removed and developed by photographic development means. Discontinuities and irregularities in the test sample surface now show up quite clearly as distinct profiles and/or black marks upon the now developed and otherwise clear photographic film.

In FIGURE 2, the surface to be tested is shown as an essentially flat plate 6. The technique used here is essentially the same as in FIGURE 1 except that if desired, the test sample together with the intermediate film layer may remain stationary while the master roller can be made to move across the combined surfaces.

It will, of course be appreciated that in practicing the present invention the photographic film must be protected from exposure to light at all times prior to its actual development. This can be accomplished by practicing the invention under light-free conditions, and this is the desirable mode of operation. However, in some instances, a surface to be tested may not readily be tested in the dark and under such circumstances, the film may be suitable surrounded with a light opaque material such as a black paper sheath.

It has been found that under typical operating conditions, voltage supply 4 performs quite satisfactorily when operating in the range of approximately 2500 volts. Higher voltages may be necessary when film sheets of greater than average thickness are used or when the film is ensheathed in paper for testing under ambient light conditions as previously mentioned. However, the voltage used should not in any event be great enough to produce electrical breakdown in the absence of discontinuities in the test sample surface.

While such an explanation is not intended to delimit the present invention or the claims appended hereto, it is thought that the mechanism of operation of the present invention involves a breakdown of dielectric between discontinuities present upon the test sample and adjacent points upon the master conductive roller. Such dielectric breakdown occurs by virtue of excessive voltage gradients existing in the neighborhood of such discontinuities or flaws in the test sample. Such a breakdown creates local areas of conductivity in the dielectric, which dielectric in the present discussion is the photographic film itself. The resulting discharge across the now conductive path reduces silver ions contained in the conductive path through the film, to metallic silver, much as does the usual exposure to light. Upon subsequent development, the path of such dielectric breakdown, and in consequence the position and shape of surface discontinuities, is then rendered clearly visible.

The invention having thus been described, it will be apparent that many modifications thereof and deviations therefrom may now readily be made by those skilled in the art. Accordingly, the invention herein disclosed is to be construed broadly and limited only by the spirit and scope of the appended claims.

What is claimed is:

1. A process for detecting irregularities upon an otherwise smooth metallic surface comprising: positioning an unexposed sheet of photographic film in face-to-face contact with said metallic surface; positioning a conductive member in contact with the side of said sheet of photographic film non-adjacent to said metallic surface; establishing an electrical potential between said metallic surface and said conductive member sufficient to cause dielectric breakdown between said irregularities and adjacent points on said conductive member; and then developing and inspecting said sheet of photographic film.

References Cited

UNITED STATES PATENTS

| | | | |
|---|---|---|---|
| 1,649,180 | 11/1927 | Peters | 346—74 XR |
| 1,702,595 | 2/1929 | Cooley | 346—74 XR |
| 2,941,144 | 6/1960 | Cannon | 324—65 XR |
| 2,953,470 | 9/1960 | Green et al. | |
| 3,023,731 | 3/1962 | Schwertz. | |
| 3,225,296 | 12/1965 | Roth | 324—61 |

FOREIGN PATENTS 734,909   8/1955   Great Britain.

RUDOLPH V. ROLINEC, *Primary Examiner.*

E. E. KUBASIEWICZ, *Assistant Examiner.*